United States Patent
Gacs et al.

[15] 3,699,600
[45] Oct. 24, 1972

[54] LOADING BRIDGE STRUCTURE

[72] Inventors: Peter T. Gacs, Palos Verdes Peninsula; Paul P. Shirzad, Palos Verdes, both of Calif.

[73] Assignee: General Steel Industries, Inc., St. Louis, Mo.

[22] Filed: Dec. 30, 1970

[21] Appl. No.: 102,599

[52] U.S. Cl. ................................................14/71
[51] Int. Cl. ...................................B65g 11/00
[58] Field of Search................................14/71

[56] References Cited

UNITED STATES PATENTS

| | | | |
|---|---|---|---|
| 3,524,207 | 8/1970 | Giarreto | 14/71 |
| 3,412,412 | 11/1968 | Kjerulf | 14/71 |
| 3,060,471 | 10/1962 | Der Yuen | 14/71 |
| 3,110,048 | 11/1963 | Bolton | 14/71 |

*Primary Examiner*—Jacob L. Nackenoff
*Attorney*—Edward D. O'Brian

[57] ABSTRACT

A swing bridge type of aircraft loading bridge structure for use in providing access between an aircraft and a terminal can be constructed so as to minimize the amount of bridge slope by using a rotunda structure attached to a loading bridge so as to move in conjunction with the bridge. A first or rotunda support is used to rotatably carry a secondary support so that this secondary support may be rotated in a horizontal plane and the rotunda structure is rotatably mounted on the secondary support so as to be capable of being rotated in a vertical plane. The axis of the vertical rotation is preferably located adjacent to the terminal. Drive means are connected to the bridge for rotating the bridge horizontally and vertically with respect to the terminal.

13 Claims, 8 Drawing Figures

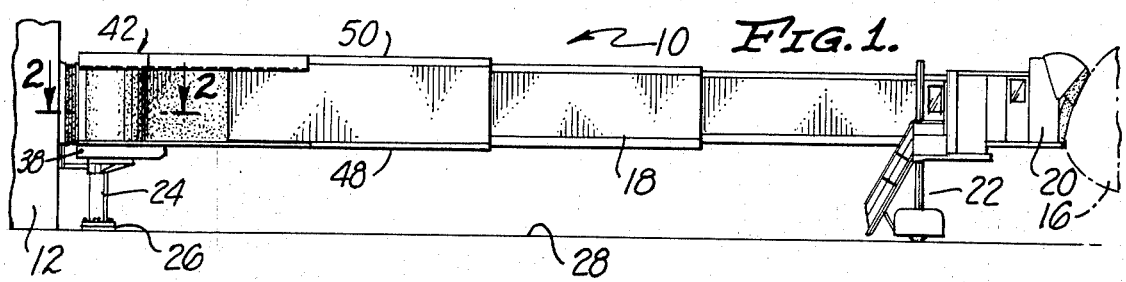
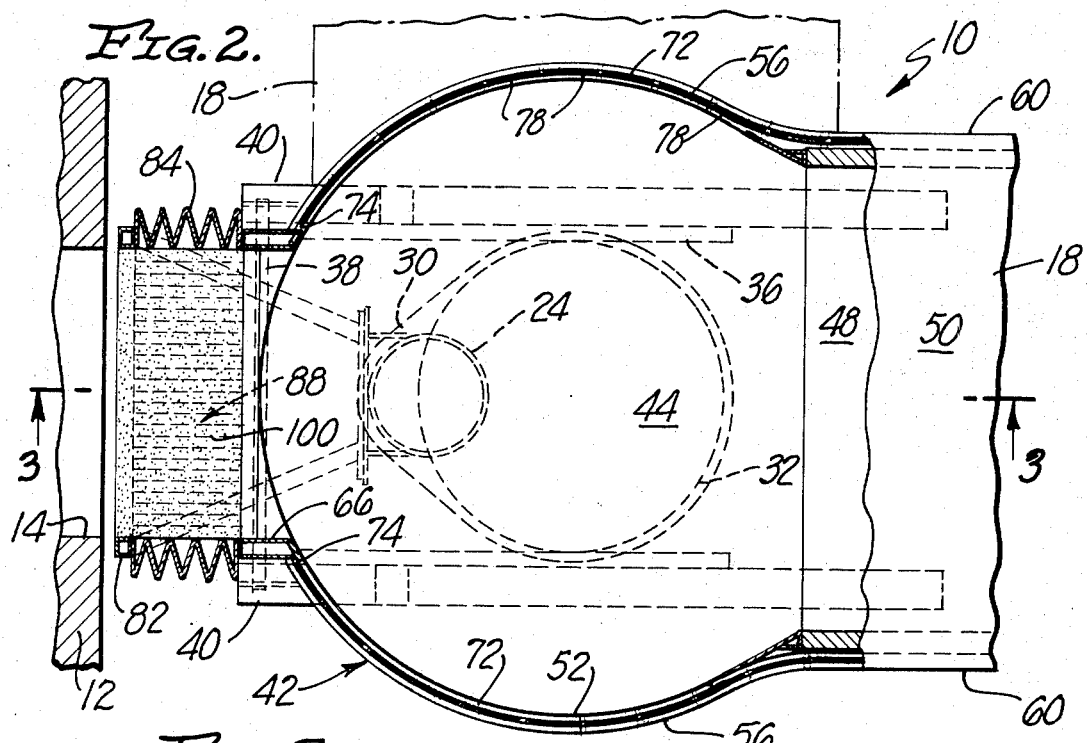
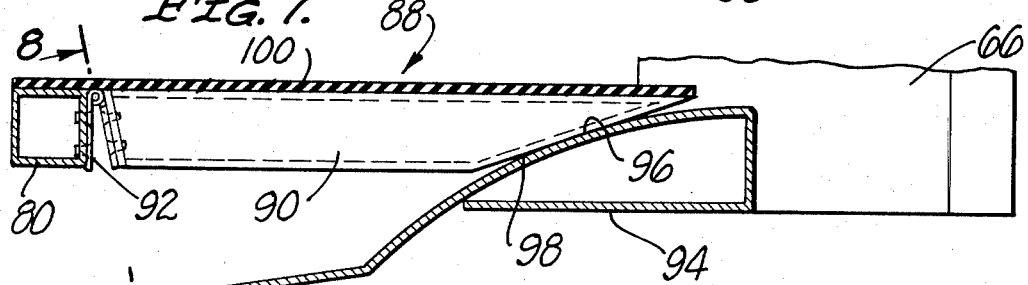
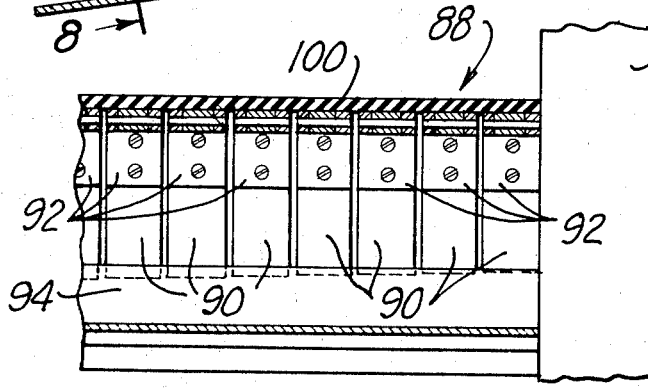
INVENTORS
PETER T. GACS,
PAUL P. SHIRZAD
BY
EDWARD D. O'BRIAN
ATTORNEY

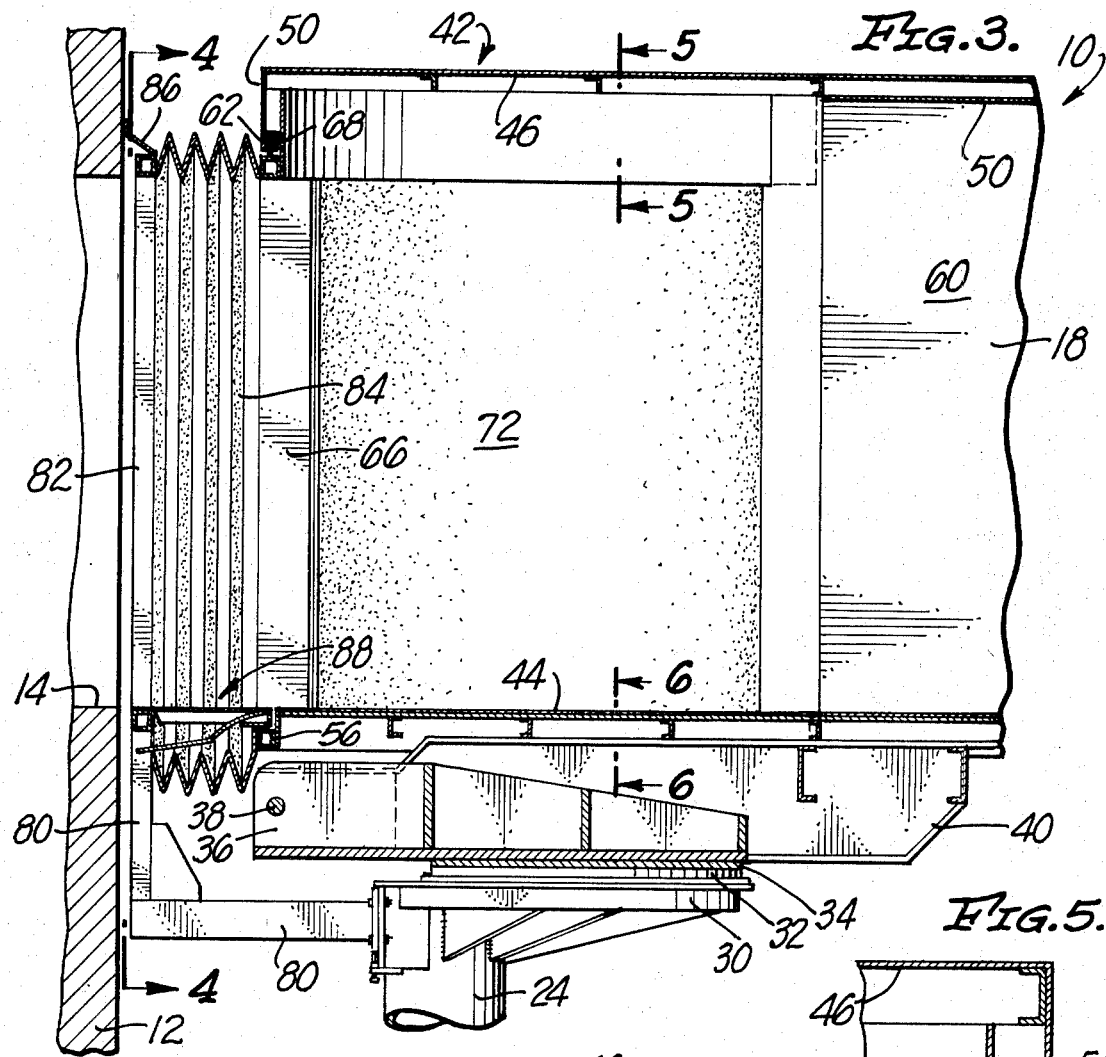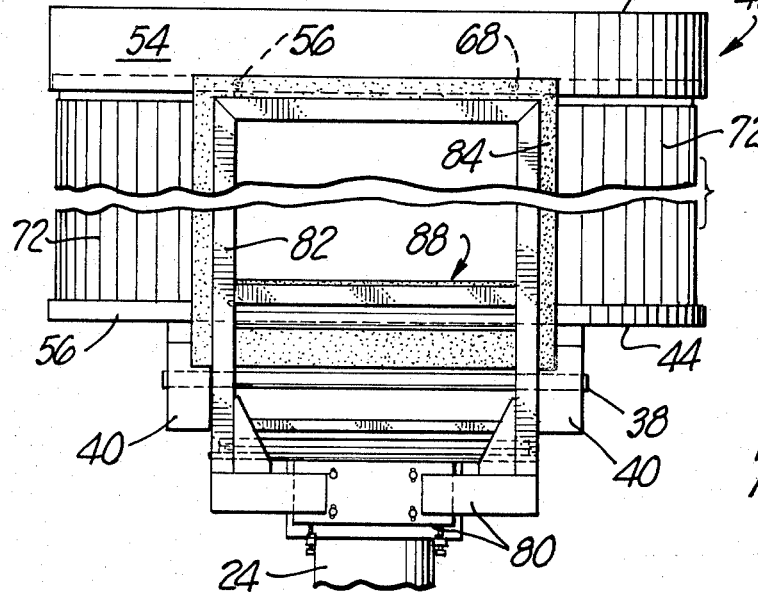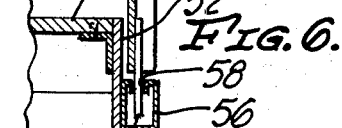

3,699,600

LOADING BRIDGE STRUCTURE

BACKGROUND OF THE INVENTION

In order to provide for passenger convenience and safety it is common place to utilize aircraft loading bridges in order to connect a terminal such as a conventional aircraft passenger terminal with aircraft. A number of different types of loading bridges have been developed and used. Different types of loading bridges are normally considered more desirable than others in particular installations for reasons which are unimportant to the present invention. Such reasons involve factors such as the layout of a passenger terminal, the space available at such a terminal, the manner in which aircraft are to be parked at such a terminal and the like.

So-called "swing bridges" are frequently desired for many installations. Such bridges are normally connected to a terminal by what are commonly termed "rotundas" permitting them to be rotated horizontally to adjacent to aircraft. They are normally pivotally mounted on such rotunda structures so that the ends of them remote from a terminal may be raised and lowered in a vertical plane so that these ends can be positioned adjacent to doors at different elevations on different types of aircraft. The horizontal and vertical rotation in a swing bridge is normally achieved through the use of a drive column mounted on the end of such a bridge remote from the associated rotunda.

One problem which has encountered with conventional swing bridges as briefly indicated in the preceding concerns the matter of the slope at which such a bridge may be located in use. Primarily for passenger safety and convenience it is desired that the slope of an aircraft loading bridge in use be minimized as much as possible. One way of minimizing such a slope is to use a comparatively long loading bridge which only has to be rotated vertically through a comparatively small arc in order to be used with different aircraft having doors at comparatively small and comparatively high elevations. Such use of comparatively long loading bridges is undesirable for several reasons.

Generally it is desired to minimize the distance which a passenger has to walk in a loading bridge in getting on or off of an aircraft. Obviously it takes longer for a passenger to walk through a long loading bridge than a short one. Also, the longer an aircraft loading bridge is the greater the structural problems encountered in designing and building such a bridge. In general the longer an aircraft loading bridge the greater the weight of such a bridge and therefore the greater the capacity of the drive structure required.

BRIEF SUMMARY OF THE INVENTION

A broad objective of the invention is to provide new and improved loading bridge structures of the swing bridge type. Further generalized objectives of the invention are to provide loading bridge structures which can be engineered and manufactured with comparatively little difficulty, which can be easily installed at an aircraft terminal, and which are capable of giving prolonged, effective, reliable service. Such generalized objectives do not indicate the principle for or purposes of the invention.

An objective of the invention is to provide bridge structures which can be shorter than existing related bridge structures and which nevertheless are capable of being used with the same aircraft as prior bridge structures but which, because of their shortness, can be used at the same slopes as prior bridge structures. This objective of the present invention is relatively difficult to understand. A bridge structure of the present invention is constructed so that in use the angle or slope of the bridge structure can be the same as the angle or slope of a prior bridge structure. This is achieved along with the advantage of a shorter bridge structure than was required in accordance with the prior art to achieve such a slope or angle.

In accordance with this invention, these objectives are achieved in a bridge structure for use in providing access between an aircraft and a terminal, the bridge structure including an elongated loading bridge and a drive means connected to the bridge for rotating the bridge horizontally and vertically with respect to the terminal in which the improvement comprises a rotunda support, a secondary support mounted on the rotunda support so as to be capable of being rotated in a horizontal plane, a rotunda structure mounted on said secondary support so as to be capable of being rotated in a vertical plane, this rotunda structure being directly connected to the bridge so that any rotation of the bridge in either a horizontal or vertical plane is transmitted to the rotunda structure in order to rotate the rotunda structure relative to the rotunda support and the terminal.

The invention encompasses a number of other features which are considered to be necessary to the construction of a desirable, complete loading bridge structure. These features relate to such matters as to the mounting of the rotunda structure on the bridge, the use and construction of a closure which will accomodate rotation of the rotunda structure and means connecting the rotunda structure with a terminal.

BRIEF DESCRIPTION OF THE DRAWINGS:

All of the features of the present invention are best explained with reference to the accompanying drawings in which:

FIG. 1 is a side elevational view of a presently preferred embodiment or form of an aircraft loading bridge structure of the present invention installed at a terminal;

FIG. 2 is a partial cross-sectional view taken at line 2—2 of FIG. 1;

FIG. 3 is a partial cross-sectional view taken at line 3—3 of FIG. 2;

FIG. 4 is a cross-sectional view taken at line 4—4 of FIG. 3 part of this view being broken away to conserve drawing space;

FIG. 5 is a partial cross-sectional view taken at line 5—5 of FIG. 3;

FIG. 6 is a partial cross-sectional view taken at line 6—6 of FIG. 3;

FIG. 7 is an enlarged, detailed view corresponding to a part of FIG. 3; and

FIG. 8 is a partial cross-sectional view taken at line 8—8 of FIG. 7.

It will be realized that the accompanying drawings are primarily intended to illustrate a presently preferred embodiment or form of the invention for explanatory purposes. Those skilled in the art of aircraft loading bridges will be able to utilize routine engineer-

DETAILED DESCRIPTION OF THE PREFERRED EMBODIMENT:

In FIG. 1 of the accompanying drawings there is shown an aircraft loading bridge structure 10 of the present invention which is used to provide access between a terminal 12 having a conventional door opening 14 and an aircraft 16. This complete structure includes a known or conventional loading bridge 18 carrying a known or conventional cab 20 which is adapted to be located adjacent to the aircraft 16. A known or conventional drive column or drive means 22 is attached to the end of the bridge 18 remote from the terminal 12 for the purpose of rotating this bridge 18 either horizontally or vertically with respect to the terminal 12. The precise loading bridge 18 illustrated is a telescopic loading bridge which can be lengthened or shortened during the operation of the drive column 22. It is to be understood that the invention is equally applicable to use with a loading bridge 18 of a fixed length.

The structure 10 includes a rotunda support 24 having the form of a large pipe which is adapted to be mounted through the use of a conventional foundation 26 to project above the ground 28 adjacent to the terminal 12. This rotunda support 24 carries a horizontally extending platform 30. A conventional bearing 32 is located on this platform 30 so as to connect it with a secondary support 34. This secondary support 34 has parallel, upstanding arms 36 which carry a pivot rod 38; this pivot rod 38 extends through base arms 40 forming a part of a rotunda structure 42. It will be noted that these base arms 40 are located off to the side of the rotunda support 24, adjacent to the terminal 12. As subsequently indicated the fact that the rod 38 is located as shown adjacent to the terminal 12 is considered to be quite important with respect to the desirability and utility of the present invention.

This rotunda structure 42 also includes a generally circular bottom 44 attached to the base 40 and a correspondingly shaped top 46 located parallel to the bottom 44. This bottom 44 is attached to the bottom 48 of the bridge 18 so as to in effect constitute an extension of the bottom 48 of the bridge 18. This top 46 is correspondingly attached to the top 50 of the bridge 18 so as to in effect constitute an extension of this top 50. It will be noted that with the construction shown the bottom 44 and the top 46 both have curved peripheries 52 and 54, respectively, extending significantly more than 180° around their centers. This is to permit the bridge 18 to be rotated approximately 90° to either side of the position in which it is shown in the drawings to a position such as is indicated in phantom in FIG. 2.

A bottom box-like channel 56 having a top centrally located slot opening 58 is located around the periphery 52 and extends along both of the sides 60 of the bridge 18. A corresponding top channel 62 having a bottom, centrally located slot opening 64 is located completely around the periphery 54 and also extends along the sides 60 of the bridge 18. These channels 56 and 62 serve to support a rectangular door frame 66 forming a part of the rotunda structure 42. This door frame 66 is located between the channels 56 and 62 as shown in FIGS. 2, 3 and 4 of the drawings. It carries small conventional wheeled carriages or trolleys 68 of a type commonly used to support curtain walls. These trolleys 68 are located within the channel 62 so that in effect the frame 66 is hung in place. Projections such as projections 70 indicated in FIG. 6 and hereinafter described in more detail are preferably located on the frame 66 so as to extend into the bottom channel 56 to stabilize the frame 66 relative to the remainder of the rotunda structure 42.

The rotunda structure 42 also includes as closure means two curtain walls 72. Each of these curtain walls 72 includes a lead edge 74 connected to the door frame 66. These curtain walls 72 carry other hangers or trolleys 76 corresponding to the previously described trolley 68 which fits within the top channel 62. At their bottoms these curtain walls 72 carry small pin-like projections 70 which fit within the channels 56 in order to stabilize the bottoms of these curtain walls 72. Each of the curtain walls 72 is of a conventional, incompressible, yet flexible type of structure capable of being bent. These curtain walls 72 may be constructed of heavy vinyl coated canvas or the like. They preferably include vertically extending slats 78 designed to prevent their bending as they extend between the top 46 and the bottom 44. These curtain walls 72 completely enclose the exterior of the rotunda structure 42 on each side of the door frame 66 and extend from the rotunda structure 42 along the sides 60 of the bridge 18.

With the structure 10 the rotunda support 24 carries a small frame 80 which in turn supports a vertically extending rectangular secondary door frame 82 of substantially the same dimensions as the door frame 66. This door frame 82 is utilized with the present invention because normally appropriate building or similar regulations preclude the direct attachment of a loading bridge structure 10 to a terminal such as the terminal 12. In effect, this frame 82 is designed more or less as a substitute for the wall of the terminal 12 around the door opening 14 in order to provide an anchoring point for all of an end of a tabular, bellows like closure or closure means 84.

This closure 84 in effect serves as a tunnel to provide protection against ambient conditions for anyone going between the rotunda structure 42 and the terminal 12. If desired conventional flashing 86 may be mounted on the terminal 12 so as to extend around the frame 66 to minimize exposure to ambient conditions. This closure 84 is connected to the door frame 66 so as to extend between and connect the two frames 82 and 66. It may be conveniently formed out of a heavy vinyl coated fabric or the like in accordance with conventional practice.

It will be noted that this closure 84 extends beneath a walkway structure or means 88 connecting the door frame 82 and the door frame 66. This walkway structure 88 includes a plurality of separate, rigid support elements 90, each of which is separately mounted by means of a hinge 92 to the door frame 82. These elements 90 are located parallel to one another immediately adjacent to one another so as to extend to shortly above a deflecting member 94 carried by the door frame 66. Each of the elements 90 has a sloping surface 98 which rests upon a curved top 96 of this deflecting member 94. Although the elements 90 in and of themselves serve as an effective walkway for appearance purposes and in order to avoid the possibility of a passenger catching a heel between them or the like, it is preferred to cover them with a flexible carpet 100. This carpet 100 may be attached in a conventional manner to the door frame 82 so that it will not get out of place.

The significance of this structure will be apparent from a consideration of the operation of the complete loading bridge structure 10. As this structure 10 is used so as to be moved in a horizontal plane relative to an aircraft such as the aircraft 16 the drive column 22 will be operated so as to rotate the bridge 18 relative to the rotunda support 24. This rotation will be about the axis of the bearing 32. As it occurs there will be a tendency for the door frame 66 and the curtain walls 72 to rotate with the remainder of the rotunda structure 42.

However, the elements 90 will engage the deflecting member 94 attached to the door frame 66 so as to exert a force on this door frame 66 sufficient to hold it in place relative to the terminal 12. As a consequence of this the trolleys 58 will move in the channel 62 in such a manner as to allow the door frame 66 to remain substantially stationary. During the rotation of the bridge 18 in a horizontal plane the connections between the door frame 66 and the curtain walls 72 will cause the trolleys 67 to move in the channel 62 so that at all times the exterior of the rotunda structure 42 between the top 46 and the bottom 44 and the sides 60 will remain closed. During such rotation both of the curtain walls 72 will be, in effect, moved relative to the remainder of the rotunda structure 42 and the sides 60 of the bridge 18.

During the use of the complete loading bridge structure 10 periodically the drive column 22 will be operated so as to raise or lower the cab 20. This will cause rotation of the bridge 18 in a vertical plane about the pivot rod 38. Such rotation will be of comparatively limited amount approximately corresponding to variations in the door height in aircraft. It will cause some slight movement in a vertical plane of the door frame 66. The closure 84 will accomodate such movement. Also such movement will be accomodated by the manner in which the elements 90 fit relative to the delfecting member 94 so that there will always be a substantially smooth walkway into and out of the rotunda structure 42.

It will be noted that the door frame 66 is located relatively close to the terminal 12 and is spaced from this terminal 12 just enough to easily accomodate the movement of the rotunda structure 42 when the bridge 18 is rotated in a vertical plane. It will be noted, also, that such rotation is bout an axis—specifically the axis of the pivot rod 38—which is relatively close to the terminal 12. As a consequence of this the degree of slope of the bridge 18 may be minimized without this bridge 18 having to be used at a undesirable angle.

This is best considered with reference to both prior conventional rotunda structures as used with loading bridges and with reference to airline desires to utilize loading bridges at a minimum slope. In the past, rotundas as used with loading bridges have been connected to such bridges so that the bridges have been pivotally mounted on the rotundas on the sides of the rotundas remote from terminals. The minimum lengths of such prior complete loading bridges have been the sums of the widths of their rotunda plus the bridge lengths from their rotundas to the bridge ends necessary to accommodate aircraft door at various heights without the bridge slope being undesirably large.

With the present invention in effect the length of the rotunda traversed by a passenger is a part of the bridge length dictated by the necessity of adjoining aircraft doors at various elevations without using a bridge at an undesired angle. As a consequence of this shorter bridges than have previously been employed can be used. This makes it possible to achieve certain economies in the manufacture of a complete bridge structure. It also shortens the distance that a passenger has to walk in boarding or leaving an aircraft. Both of these matters are considered important.

We claim:

1. An aircraft loading bridge structure for use in providing access between an aircraft and a terminal said bridge structure including an elongated loading bridge and a drive means connected to said bridge for rotating said bridge horizontally and vertically with respect to the terminal, in which the improvement comprises:

a rotunda support, a secondary support, vertical axis pivot means mounting said secondary support on said rotunda support for rotation in a horizontal plane, a rotunda structure concentric with said vertical axis pivot means, horizontal axis pivot means mounting said rotunda structure on said secondary support for rotation in a vertical plane, said rotunda structure being rigidly connected to the terminal end of said bridge whereby any rotation of said bridge in either a horizontal or vertical plane is transmitted in full to said rotunda structure in order to rotate said rotunda structure correspondingly relative to said rotunda support and the terminal, said horizontal axis pivot means extending transversely of said bridge and being offset radially of said rotunda structure from said vertical axis pivot means in the opposite direction from the connection of said rotunda structure to said bridge whereby to maximize the effective length of the bridge structure in proportion to its over-all length and thereby minimize its slope.

2. An aircraft loading bridge structure as claimed in claim 1 wherein:

said bridge includes a top and a bottom and said rotunda structure includes a top and a bottom, said top of said rotunda structure being rigidly connected to said top of said bridge so as to constitute an extension of the top of said bridge, said bottom of said rotunda structure being connected to said bottom of said bridge so as to constitute an extension of the bottom of said bridge.

3. An aircraft loading bridge structure for use in providing access between an aircraft and a terminal, said bridge structure including an elongated loading bridge and a drive means connected to said bridge for rotating said bridge horizontally and vertically with respect to the terminal, in which the improvement comprises:
  a rotunda support,
  a secondary support,
  vertical axis pivot means mounting said secondary support on said rotunda support for rotation in a horizontal plane,
  a rotunda structure concentric with said vertical axis pivot means,
  horizontal axis pivot means mounting said rotunda structure on said secondary support for rotation in a vertical plane,
  said rotunda structure being rigidly connected to the terminal end of said bridge whereby any rotation of said bridge in either a horizontal or vertical plane is transmitted in full to said rotunda structure in order to rotate said rotunda structure correspondingly relative to said rotunda support and the terminal,
  said bridge including a top and a bottom and said rotunda structure including a top and a bottom, said top of said rotunda structure being rigidly connected to said top of said bridge so as to constitute an extension of the top of said bridge, said bottom of said rotunda structure being rigidly connected to said bottom of said bridge so as to constitute an extension of the bottom of said bridge,
  said rotunda structure including a door frame, means mounting said door frame on said top and said bottom of said rotunda structure for movement along the peripheries of said top and said bottom of said rotunda structure,
  said rotunda structure also including closure means for enclosing the interior of said rotunda attached to said door frame and extending around the periphery of said rotunda structure between said top and said bottom of said rotunda structure.

4. An aircraft loading bridge structure as claimed in claim 3 wherein:
  said closure means comprises curtain means and support means for supporting said curtain means attached to said curtain means,
  said rotunda structure further includes track means extending around the periphery of said rotunda from one side of said loading bridge to the other side of said loading bridge,
  support means engaged with said track means for guidingly supporting said curtain means from said track means whereby to permit rotation of said bridge structure in a horizontal plane and
  said door frame is supported by said track means for movement therealong with respect to said top and said bottom of said rotunda structure whereby to be capable of remaining stationary during rotation of said bridge structure in a horizontal plane.

5. An aircraft loading bridge structure as claimed in claim 4 wherein:
  the length of said curtain means is fixed,
  said track means extend from said rotunda structure along the sides of said loading bridge,
  whereby said curtain means may be supported by portions of said track means along the sides of said bridge during rotation of said bridge in a horizontal plane.

6. An aircraft loading bridge structure as claimed in claim 3 including:
  means for holding said door frame against horizontal rotation with said rotunda.

7. An aircraft loading bridge structure as claimed in claim 3 including:
  walkway means for providing a walkway from said terminal into said rotunda structure, said walkway means extending from said terminal and engaging said door frame whereby to prevent rotation of said door frame in a horizontal plane.

8. An aircraft loading bridge structure as claimed in claim 7 wherein:
  said walkway means includes a plurality of separate elements,
  means pivotally mounting each of said elements for vertical rotation relative to said terminal,
  each of said elements includes a sloping surface, and
  said door frame includes a deflecting member, said deflecting member having a sloping surface engaged by said sloping surfaces of said separate elements, the engagement between said separate elements and said deflecting member serving to position said separate elements whereby to provide a walkway into said rotunda structure through said door frame in all positions of said rotunda structure.

9. An aircraft loading bridge structure as claimed in claim 8 including:
  flexible carpet means for providing a walking surface located on the tops of said separate elements, said flexible carpet means providing a smooth, continuous surface into said rotunda structure in various positions of said rotunda structure.

10. An aircraft loading bridge structure as claimed in claim 3 wherein:
  said closure means comprises curtain means and support means for supporting said curtain means attached to said curtain means,
  said rotunda structure further includes track means extending around the periphery of said rotunda from one side of said loading bridge to the other side of said loading bridge,
  said support means engages said track means to support said curtain means from said track means and permit rotation of said bridge structure in a horizontal plane,
  said door frame is supported by said track means for movement with respect to said top and said bottom of said rotunda structure whereby to be capable of remaining stationary during rotation of said bridge structure in a horizontal plane, and there is walkway means for providing a walkway from said terminal into said rotunda structure, said walkway means extending from said terminal and engaging said door frame whereby to prevent rotation of said door frame in a horizontal plane.

11. An aircraft loading bridge structure as claimed in claim 3 wherein:
  said rotunda structure also includes means for holding said door frame against horizontal rotation with said rotunda, and
  means connecting said door frame with said terminal,
  said horizontal axis pivot means being adjacent to said terminal and said means connecting said door frame with said terminal.

12. An aircraft loading bridge structure as claimed in claim 11 wherein:

said means connecting said door frame with said terminal and said means for holding said door frame includes, walkway means for providing a walkway from said terminal into said rotunda structure, said walkway means extending from said terminal and engaging said door frame whereby prevent rotation of said door frame in a horizontal plane, and a second closure means for providing an enclosed passage between said terminal and the interior of said rotunda structure through said door frame.

13. An aircraft loading bridge structure as claimed in claim 12 wherein:

said second closure means is a bellows type closure extending above said walkway means.

* * * * *